US011245673B2

(12) United States Patent
Rasbornig

(10) Patent No.: US 11,245,673 B2
(45) Date of Patent: Feb. 8, 2022

(54) METHOD FOR COMMUNICATING DATA FROM A SENSOR DEVICE TO AN ELECTRONIC CONTROL UNIT, A SENSOR DEVICE AND AN ELECTRONIC CONTROL UNIT

(71) Applicant: Infineon Technologies AG, Neubiberg (DE)

(72) Inventor: Friedrich Rasbornig, Klagenfurt (AT)

(73) Assignee: Infineon Technologies AG, Neubiberg (DE)

( * ) Notice: Subject to any disclaimer, the term of this patent is extended or adjusted under 35 U.S.C. 154(b) by 895 days.

(21) Appl. No.: 15/437,651

(22) Filed: Feb. 21, 2017

(65) Prior Publication Data
US 2017/0250961 A1 Aug. 31, 2017

(30) Foreign Application Priority Data
Feb. 26, 2016 (DE) ...................... 10 2016 103 498.3

(51) Int. Cl.
*H04L 9/00* (2006.01)
*H04L 29/06* (2006.01)
*H04L 29/08* (2006.01)
*H04L 9/08* (2006.01)

(52) U.S. Cl.
CPC ........ *H04L 63/0428* (2013.01); *H04L 9/0819* (2013.01); *H04L 63/0442* (2013.01); *H04L 67/12* (2013.01); *H04L 63/061* (2013.01); *H04L 2209/84* (2013.01)

(58) Field of Classification Search
CPC ............ H04L 63/0428; H04L 63/0442; H04L 63/061; H04L 67/12; H04L 9/0819; H04L 2209/84

USPC ......................................................... 380/255
See application file for complete search history.

(56) References Cited

U.S. PATENT DOCUMENTS

| 7,512,236 | B1 * | 3/2009 | Zhu ...................... G06Q 20/027 380/255 |
| 9,252,945 | B2 | 2/2016 | Lewis et al. |
| 2011/0246047 | A1 * | 10/2011 | Smith ...................... F02D 41/22 701/103 |

(Continued)

FOREIGN PATENT DOCUMENTS

| JP | S6346028 A | 2/1988 |
| JP | 2012511116 A | 5/2012 |

(Continued)

OTHER PUBLICATIONS

"Samuel woo et al., A Practical Wireless Attack on the Connected Car and Security Protocol for In-Vehicle CAN, 2015, IEE, col. 16, pp. 993-1006" (Year: 2015).*

(Continued)

*Primary Examiner* — Shewaye Gelagay
*Assistant Examiner* — Kevin Ayala
(74) *Attorney, Agent, or Firm* — Eschweiler & Potashnik, LLC

(57) ABSTRACT

A method for communicating data from a sensor device to an Electronic Control Unit using a single-wire bi-directional communication protocol includes providing a first key of the Electronic Control Unit to the sensor device, encrypting sensor data of the sensor device using the first key to determine encrypted data, and transmitting the encrypted data from the sensor device to the Electronic Control Unit.

3 Claims, 4 Drawing Sheets

(56) References Cited

U.S. PATENT DOCUMENTS

| | | | |
|---|---|---|---|
| 2012/0128057 A1 | 5/2012 | Daecke et al. | |
| 2012/0155645 A1* | 6/2012 | Prochaska | H04L 63/0435 380/278 |
| 2012/0284511 A1* | 11/2012 | Paddon | H04W 4/02 713/168 |
| 2014/0214970 A1 | 7/2014 | Rasbornig et al. | |
| 2014/0301550 A1* | 10/2014 | Lewis | H04L 9/0825 380/259 |
| 2014/0304511 A1 | 10/2014 | Lewis et al. | |
| 2015/0229469 A1 | 8/2015 | Hainz | |
| 2015/0236876 A1* | 8/2015 | Cadugan | H04L 25/03834 375/242 |
| 2015/0270954 A1* | 9/2015 | Gross | H04L 9/0618 380/28 |
| 2016/0352520 A1* | 12/2016 | Schwach | H04L 9/3231 |
| 2017/0207917 A1* | 7/2017 | Davis | H04L 9/3066 |

FOREIGN PATENT DOCUMENTS

| | | | |
|---|---|---|---|
| JP | 2014204444 A | 10/2014 | |
| JP | 2015186259 A | 10/2015 | |
| KR | 20110057348 A | 6/2011 | |

OTHER PUBLICATIONS

Computer Network Basic Course, p. 29; Jul. 31, 2015.
EMU Network Control, p. 37; Jan. 31, 2013.

* cited by examiner

METHOD FOR COMMUNICATING DATA FROM A SENSOR DEVICE TO AN ELECTRONIC CONTROL UNIT, A SENSOR DEVICE AND AN ELECTRONIC CONTROL UNIT

CROSS REFERENCE TO RELATED APPLICATIONS

This application claims priority to German Application number 10 2016 103 498.3 filed on Feb. 26, 2016, the contents of which are incorporated by reference in their entirety.

FIELD

Embodiments relate to methods for communicating data from a sensor device to an Electronic Control Unit, for example within vehicles.

BACKGROUND

Unauthorized intrusion into communication networks with the aim of compromising the system is an increasing threat for various applications. Even vehicles can be a target for those attacks, enabling the "Hacker" to influence the behavior of the vehicle in a way which is not intended by the driver or the car manufacturer. A loose of control over the vehicle and an unsafe driving behavior may be the consequence of a successful attack, e.g. if the whole communication network is deactivated or if single components of the system are deliberately manipulated in a way potentially posing a threat for the driver and the environment of the vehicle. For example, the Controller Area Network (CAN) Bus may be used to interconnect various Electronic Control Units (ECU) within the vehicle, each Electronic Control Unit coordinating one or several functions of the vehicle, such as for example braking or steering based on the reading of various sensors within the vehicle. In such an environment, an attack may have the goal of blocking the braking or steering capability by manipulating the ECU's, once access to the communications network has been gained. Approaches to enhance the security of those systems focus on securing the devices or ECU's potentially granting access to the communications network, such as for example on the on board diagnostics interface (OBD) of today's vehicles. However, once access to the communication network has been gained, manipulations might be deliberately performed. Hence, there appears to be a demand to enhance the security.

SUMMARY

This demand is satisfied by the embodiments according to the independent claims.

According to one embodiment, a method for communicating data from a sensor device to an Electronic Control Unit using a single-wire bi-directional communication protocol comprises providing a first key of the Electronic Control Unit to the sensor device. Further, the method comprises encrypting sensor data of the sensor device using the first key to determine encrypted data and transmitting the encrypted data from the sensor device to the Electronic Control Unit. By encrypting data transmitted from a sensor device to its associated ECU, also more complex security attacks can be prohibited. In the event that the ECU's and their associated communication networks are sufficiently secured, an attacker might otherwise corrupt the sensor devices or the communication between the sensor devices and the ECU's. Since the sensor devices provide input parameters which are used within the system to determine as to how to operate other devices or actuators within the vehicle, corrupting the sensor data might also serve to pose a threat to the whole system. For example, manipulating the sensor reading of an anti-lock break system (ABS) sensor might also result in loss of braking capabilities, while the ECU of the ABS system itself is completely uncorrupted. Embodiments of the present invention prevent the corruption of the sensor data, since the data transferred from a sensor device to its associated ECU is encrypted. Consequently, also the previously outlined complex attacks on a vehicle may be prohibited. Embodiments may achieve this without the necessity to change the wiring between the sensors and their associated ECU's, so that single wire-bi directional communication protocols which are often used for communication between sensor devices and an ECU can be maintained.

According to some embodiments, a method for communicating data from a sensor device to an Electronic Control Unit comprises transmitting a first key from the Electronic Control Unit to the sensor device and encrypting sensor data of the sensor device using the first key to determine encrypted data. The encrypted data is transmitted from the sensor device to the Electronic Control Unit. Transferring the key from the ECU to the sensor device that is subsequently used for encryption may allow to combine devices of different manufacturers without prior coordination since the key does not have to be stored in the sensor device beforehand. Communication between Electronic Control Units and sensor devices having bi-directional communication capabilities may, therefore, be secured in an efficient manner.

According to some embodiments, a method for communicating data from a sensor device to an Electronic Control Unit comprises exchanging a first key of the Electronic Control Unit and a second key of the sensor device between the sensor device and the Electronic Control Unit using an asynchronous data transfer protocol and encrypting sensor data of the sensor device using the first key to determine encrypted data. The encrypted data is transmitted from the sensor device to the Electronic Control Unit. According to further embodiments, the first key and the second key may be exchanged using a synchronous data transfer protocol. According to further embodiments, the first key and the second key may be exchanged using an asymmetric data transfer protocol.

According to some embodiments, a sensor device for communicating sensor data to an Electronic Control Unit comprises a key interface configured to provide a first key of the Electronic Control Unit. An encryption module configured to encrypt the sensor data using the first key to determine encrypted data and an output interface is configured to transmit the encrypted data to the Electronic Control Unit using a wired connection. The sensor device further comprises an input interface configured to receive data from the Electronic Control Unit. The sensor device having a bi-directional communication interface comprising an input interface as well as an output interface may therefore be used to provide sensor data in a way that makes it hard if not impossible for an attacker to alter the data in a predictable manner perform an attack on the system with a predictable outcome.

According to further embodiments, an Electronic Control Unit for receiving sensor data from a sensor device comprises a key interface configured to provide an internal key of the Electronic Control Unit and an input interface configured to receive encrypted data from the sensor device using a wired connection. The ECU further comprises an output interface configured to transmit data to the sensor device; and a decryption module configured to decrypt the encrypted data using the internal key to determine the sensor data. The ECU having a bi-directional communication interface may be used to receive sensor data of a sensor device in a secure way.

BRIEF DESCRIPTION OF THE DRAWINGS

Some embodiments of apparatuses and/or methods will be described in the following by way of example only, and with reference to the accompanying figures, in which.

DETAILED DESCRIPTION

Various examples will now be described in greater detail with reference to the accompanying drawings in which some examples are illustrated. In the figures, the thicknesses of lines, layers and/or regions may be exaggerated for clarity.

It will be understood that when an element is referred to as being "connected" or "coupled" to another element, the elements may be directly connected or coupled or via one or more intervening elements. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent", to name just a few examples).

The terminology used herein is for the purpose of describing particular examples are not intended to be limiting for further examples. Whenever a singular form such as "a," "an" and "the" is used and using only a single element is neither explicitly or implicitly defined as being mandatory, further examples may also use plural elements to implement the same functionality. Likewise, when a functionality is subsequently described as being implemented using multiple elements, further examples may implement the same functionality using a single element or processing entity. It will be further understood that the terms "comprises," "comprising," "includes" and/or "including," when used, specify the presence of the stated features, integers, steps, operations, processes, acts, elements and/or components, but do not preclude the presence or addition of one or more other features, integers, steps, operations, processes, acts, elements, components and/or any group thereof.

Figure 1:
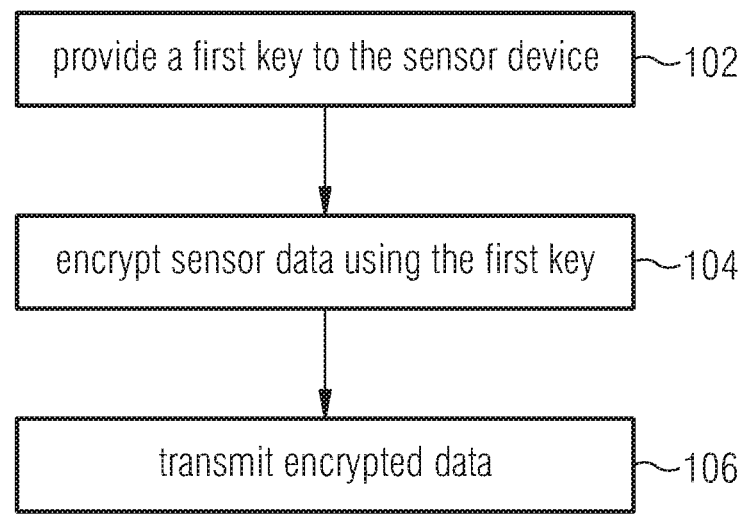
FIG. 1 illustrates a flow chart of an embodiment of a method for communicating data from a sensor device to an Electronic Control Unit.

FIG. 1 illustrates a flow chart of an embodiment of a method for communicating data from a sensor device to an Electronic Control Unit.

The embodiment comprises providing 102 a first key of the Electronic Control Unit to the sensor device. Further, the method comprises encrypting 104 sensor data of the sensor device using the first key to determine encrypted data; and 106 transmitting the encrypted data from the sensor device to the Electronic Control Unit. Instead of transmitting the sensor data as plain data, the sensor data is encrypted before transmission in order to prohibit security attacks on the communication from the sensor device to the Electronic Control Unit or on the system using the sensor data. Sensor data to be encrypted may be any data transmitted from the sensor to the ECU, for example the data describing a physical quantity determined by the sensor. In some embodiments, other data transmitted from the sensor may also be encrypted, although it might not be critical for the security of the system if this data was corrupted. An example for such data is configuration data of the sensor device. In other words, in some embodiments all data transmitted from the sensor device to the Electronic Control Unit is encrypted, while other embodiments may only encrypt part of the transmitted data.

According to some embodiments, the first key used to encrypt data is transmitted from the Electronic Control Unit to the sensor device. This may allow to use a unique key for each ECU, enhancing the security of the approach since a compromised key of one ECU, e.g. within a single vehicle does not affect the security of the communication of other ECU's of the same type or of the same manufacturer. Other embodiments, however, may retrieve the first key from an internal storage, i.e. the first key is provided by a different technology, maybe even by a third device. The encryption performed may use arbitrary encryption algorithms, be it symmetric encryption or asymmetric encryption (public key encryption). Some of the presently known algorithms are, without claiming completeness, the symmetrical encryption standards Advanced Encryption Standard (AES) and its predecessor Encryption Standard (DES), as well as asymmetric encryption according to Pretty Good Privacy (PGP, Open PP Standard RFC 4880). Likewise, the keys could be arbitrary but sequences or other data representations usable for encrypting the sensor data.

Figure 2:
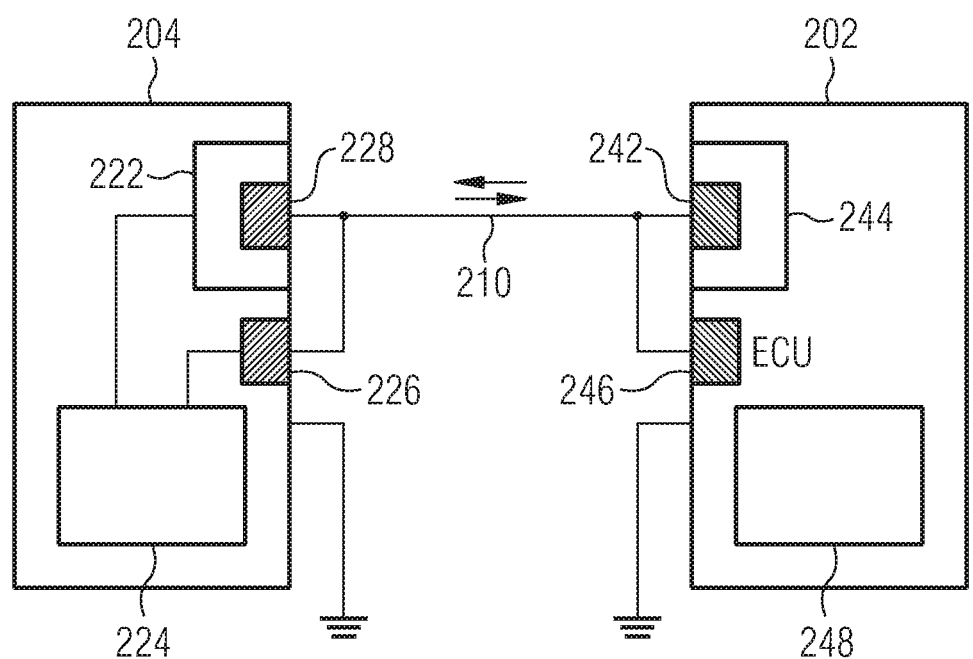
FIG. 2 a schematic view of an embodiment of a sensor device and an associated Electronic Control Unit communicating with one another using a single-wire bi-directional communication protocol.

A schematic illustration of a System comprising an Electronic Control Unit 202 and a sensor device 204 communicating with each other using a single-wire bi-directional communication protocol is illustrated in FIG. 2. The functionality of several further embodiments is subsequently described while revering to FIG. 1 or FIG. 2, whatever is more appropriate.

Figure 3:
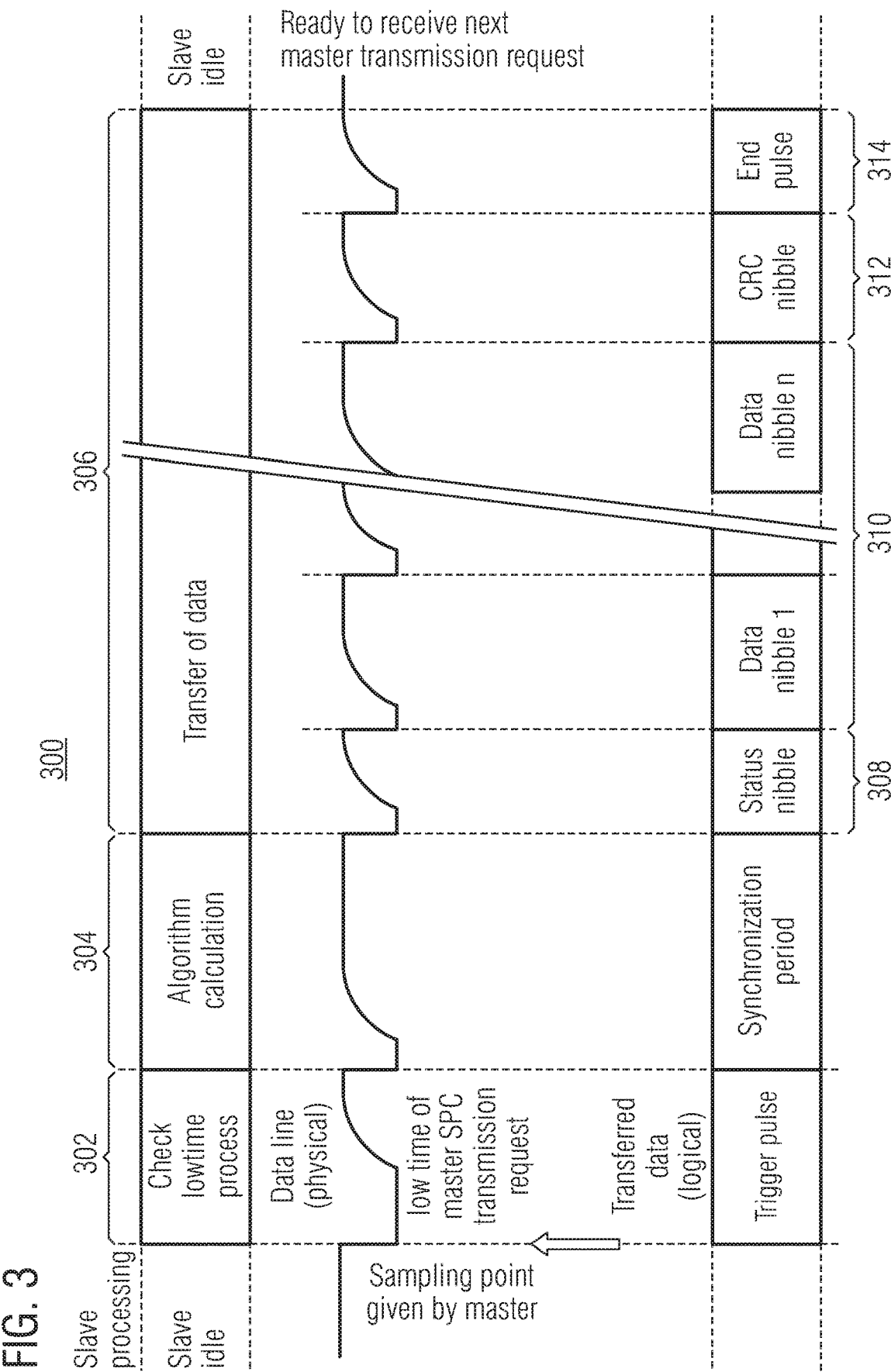
FIG. 3 illustrates an example of a single-wire bi-directional communication protocol which may be used to perform the communication between the sensor device and the Electronic Control Unit.
Figure 4:
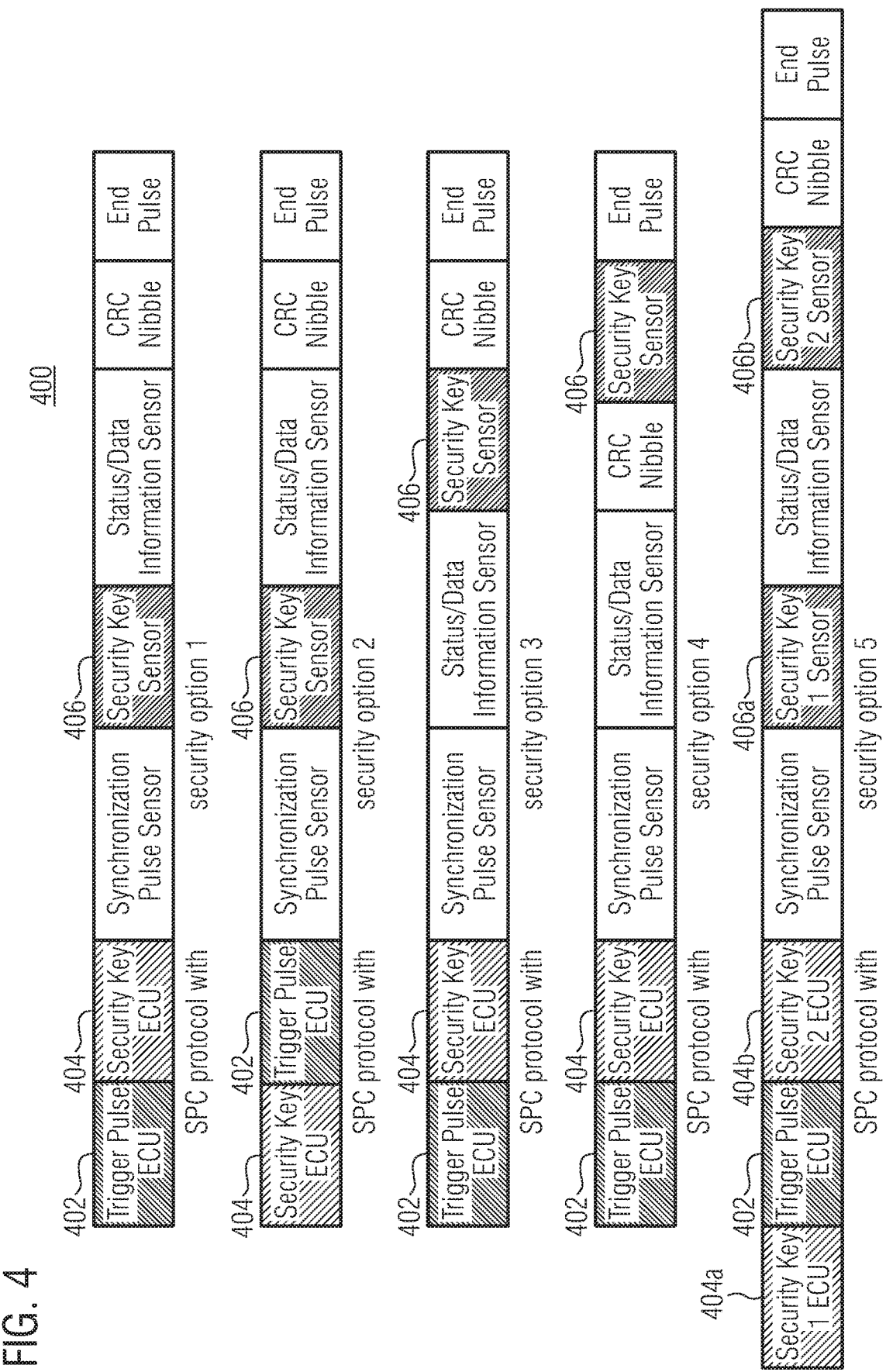
FIG. 4 illustrates several embodiments using different positions within a data frame to exchange keys between the sensor device and the Electronic Control Unit.
Figure 5:
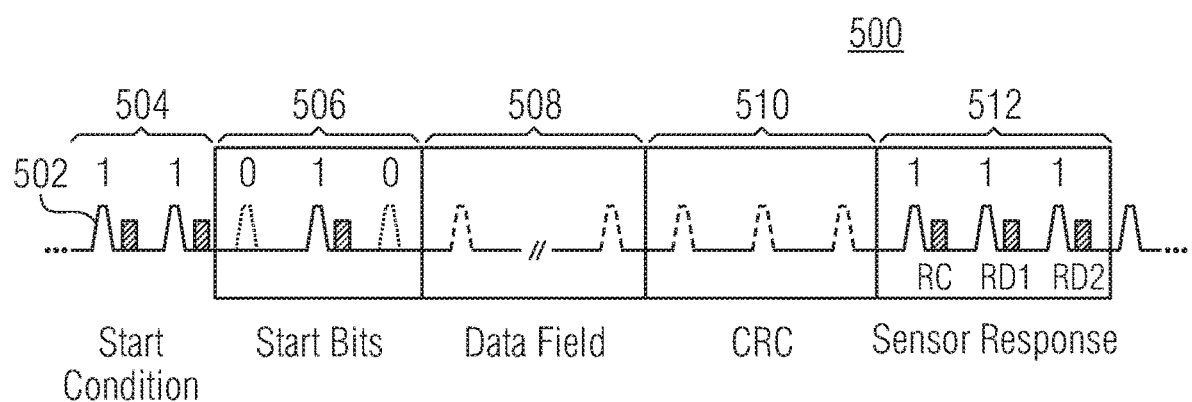
FIG. 5 illustrates a further embodiment of a single-wire bi-directional communication protocol which may be used to perform the communication between the sensor device and the Electronic Control Unit.

The signals containing the logical information may be transported via a single wire 210 of a wired connection by those protocols, for transmissions from the ECU 202 to the sensor device 204 as well as for transmissions from the sensor device 204 to the ECU 202. This does, however, not mean that there may not exist more one or more additional wires interconnecting the sensor device 204 and the ECU 202 in further embodiments. While FIG. 2 only illustrates the single wire 210 for data transfer, other embodiments may use 2, 3 or more wires interconnecting sensor device 204 and ECU 202, for example for establishing a ground connection and/or for providing supply power from the ECU 202 to the sensor device 204 or vice versa. Single wire protocols are often used for transmitting data from sensor devices to their associated ECUs in industrial applications since these allow cost effective implementations. Nonetheless, due to their capability for bi-directional communication, they also allow a key transfer from the ECU 202 to the sensor device 204. Two particular examples of bi-directional protocols are illustrated in FIGS. 3 to 5 and will show how this may be achieved.

The sensor device 204 has the capability to measure at least one physical quantity and to communicate information on the physical quantity to the ECU 202 using a communication protocol. Further embodiments may also use sensor devices 204 measuring two, three or more physical quantities at a time and to communicate information on all or on a subset of the physical quantities to the ECU 202. For example in vehicle applications, physical quantities measured may comprise magnetic fields, torques, velocities, accelerations, rotational velocities, mass flowrates of air, distances, temperatures, pressures, light intensities, composition of gas mixtures and many more.

The ECU 202 is capable of communicating with the sensor device 204 using the chosen protocol and to receive the information on the physical quantity for further processing and/or to just forward the information to other processing entities, depending on the implementation. Depending on the circumstances, a single ECU may also serve to communicate with multiple sensor devices. In some implementations, a ECU may also be used to provide configuration messages to the sensor devices in order to be able to use the sensor devices in different operation modes. For example, Sensor devices may be configured to use different resolutions to transmit the information on the physical quantity by means of configuration messages received from the ECU.

According to some embodiments, a trigger pulse is transmitted from the Electronic Control 202 Unit to the sensor device 204, the trigger pulse indicating the start of a data frame. The encrypted data is transmitted by the sensor device 204 in response to the trigger pulse. This may enable the ECU to control the rate at which data is received from the Sensor device. Further, the trigger pulse may be used to establish a common timing for the ECU and the sensor device in order to enable both to decode and unambiguously identify the individual bits of data within a data frame.

According to some embodiments, the first key is transmitted using the trigger pulse. This may enable backwards compatibility with already existing applications. While ECU's and sensor devices supporting encryption may be capable of receiving the key from the trigger pulse, other sensor devices may treat the trigger pulse conventionally to start transmitting data and/or to synchronize with the ECU.

While some embodiments transmit the complete first key in a single message, e.g. within a single trigger pulse, further embodiments transmit the first key split over several messages.

According to the latter embodiments, transmitting the first key from the Electronic Control Unit to the sensor device comprises transmitting a first portion of the first key before a first trigger pulse of a first data frame and transmitting a second portion of the first key before a second trigger pulse of a subsequent second data frame. This may enable to use longer keys for stronger encryption or to implement encryption using or only minimally modifying existing bi-directional communication protocols that provide a low data rate for the transmission from the ECU to the sensor device.

According to some embodiments, the first key is transmitted before a trigger pulse, irrespective whether the transmission is split over several transmission intervals or not. The first key is transmitted before a trigger pulse indicates the start of a regular data frame. This may also allow for a fully backwards compatible implementation of encryption capabilities into existing communication protocols, as for example into devices communicating according to Peripheral Sensor Interface for Automotive Applications (PSI, e.g. PSI5) or Short PWM Code (SPC). Older devices will disregard the first key under those circumstances, while newer devices would be able to receive the first key and to establish encrypted communication.

Further embodiments also transmit a second key from the sensor device to the Electronic Control Unit, enabling to use individual keys for each sensor device to enhance the security for both, symmetric or asymmetric encryption algorithms. Similar to the different transmission modes for the first key, the second key may be transmitted within a single data frame or split over several frames. According to further embodiments, therefore, transmitting the second key from the sensor device to the Electronic Control Unit comprises transmitting a first portion of the second key before a first trigger pulse of a first data frame; and transmitting a second portion of the second key before a second trigger pulse of a subsequent second data frame.

Further embodiments also encrypt data sent from a ECU to the sensor device. This may further enhance the security of the system. For example, configuration messages from the ECU to the sensor may s be protected in order to avoid compromising the system by configuring the sensor to provide an inappropriate output.

Some embodiments supporting encryption in both directions comprise exchanging the first key of the Electronic Control Unit and the second key of the sensor device using an asynchronous data transfer protocol. In an asynchronous data protocol, data may be transmitted without the use of an external clock signal and data can be transmitted intermittently rather than in a steady stream. Therefore, data is not necessarily transmitted at regular intervals, thus making possible a variable bit rate, and that the transmitter and receiver clock generators do not have to be exactly synchronized all the time. Any timing required to recover data from the communication symbols may be encoded within the symbols. Further embodiments may alternatively exchange the first key of the Electronic Control Unit and the second key of the sensor device using a synchronous data transfer protocol where data is transmitted or exchanged at regular time intervals.

According to further embodiments, the first key and the second key may be exchanged using an asymmetric data transfer protocol. An asymmetric data transfer protocol is a data transfer protocol where a data transmission in one direction differs by at least one property from the data transmission in the opposite direction. An asymmetry may arise from different data rates for the communication directed from the ECU to the sensor device and vice versa. For example, some embodiments may use a data transfer protocol having a lower data rate for transmissions from the ECU to the sensor device than for transmissions from the sensor device to the ECU. An asymmetry may also arise from the physical layer transport mechanism. For example, a transmissions of data in one direction may use voltage modulation while the transmission in the other direction may use current modulation.

In order to enable the communication of data from a sensor device 204 to an Electronic Control Unit 202 according to the embodiments described herein, a sensor device for communicating sensor data to an Electronic Control Unit, comprises a key interface 222 configured to provide a first key of the Electronic Control Unit 202. An encryption module 224 of the sensor device 204 is configured to encrypt the sensor data using the first key to determine encrypted data and an output interface 226 is configured to transmit the encrypted data to the Electronic Control Unit 202 using a wired connection 210. An input interface 228 is configured to receive data from the Electronic Control Unit 202.

According to some embodiments, the key interface 222 is configured to receive the first key from the Electronic Control Unit 202 via the input interface 228, as illustrated in FIG. 2.

In implementations for single wire protocols, the input interface 228 is configured to receive data from the Electronic Control Unit 202 using the same wired connection 210 as the output interface 226.

In embodiments optionally also supporting encryption of data transmitted from the ECU 202 to the sensor device 204, the sensor device 204 further comprises a decryption module configured to decrypt a data transmission from the Electronic Control Unit using an internal key of the sensor device.

In case of symmetric encryption, the internal key may correspond to the first key received from the ECU 202.

In case of asymmetric encryption, the internal key may be a private key of a private/public key pair. In order to exchange the public key, further embodiments of sensor devices comprise an output interface 226 further configured to transmit a second key to the Electronic Control 202 Unit, the second key being a public key associated to the internal key.

Some embodiments of sensor devices optionally further comprise a sensor configured to determine the sensor data, which is indicative of a physical quantity. The sensor data may in some applications be a quantitative description of the physical quantity, representing a measurement of the same. In other embodiments, the sensor data may describe the physical quantity on a more abstract level, e.g. indicating, whether the physical quantity exhibits a certain property or not. For example in the event of a magnetic field, some embodiments of sensor elements may transmit the field strength (e.g. in units of Tesla) as the sensor data, while others may only transmit the information, whether the magnetic field exceeded a predetermined threshold as the sensor data. Sensor devices measuring a magnetic field as the physical quantity are, for example, used as anti-lock brake system sensors in automobile applications.

As further illustrated in FIG. 2, the Electronic Control Unit 202 for receiving sensor data from a sensor device 204 comprises a key interface 244 configured to provide an internal key of the Electronic Control Unit 202. The Electronic Control Unit 202 further comprises an input interface 242 configured to receive encrypted data from the sensor device 204 using a wired connection 210 and an output interface 246 configured to transmit data to the sensor device 204. Further, the Electronic Control Unit 202 comprises a decryption module 248 configured to decrypt the encrypted data using the internal key to determine the sensor data. In a single-wire implementation, the output interface 246 is configured to transmit data to the sensor device 204 using the same wired connection 210 as the input interface.

For similar reasons than the sensor device, some embodiments of Electronic Control Units have an output interface which is further configured to transmit a first key to the sensor device, the first key being a public key associated to the internal key.

Further, embodiments of ECU'S 202 may optionally comprise an encryption module configured to encrypt data using a second key to determine encrypted data. Optionally, further embodiments of Electronic Control Units comprise an input interface 242 which is further configured to receive the second key from the sensor device 202.

Some embodiments of ECU's 202 and Sensor devices 204 are suited for automotive applications, so that the Electronic Control Unit 202 is configured to receive information from a sensor device 204 of a vehicle.

In summary, the embodiments propose to secure the data transfer between a sensor ASIC or sensor device and an Electronic Control Unit (Microcontroller) via a bi-directional and optionally a single-wire protocol. This may serve to prevent an intervention from an external side by a third person. Otherwise, if the data transferred is known as well as how the protocol transmission is done between the sensor and the ECU, an attack may be conceivable. This information, however, may be accessible due to the description in the corresponding datasheets or application notes. As opposed to functional safety related issues, securing of data transfer between two systems components (e.g. sensor and ECU) especially for a critical applications (e.g. electronic power steering, ABS/ESP etc.), is not required to cope with electrical disturbances (EMC or ESD events) or with random hardware failures in one of the components, but to prevent a deliberate attack on the communication, for example by a hacker.

The subsequent figures illustrate particular possible implementations for the SPC protocol and for the PSI5 protocol, in particular for its tooth-gap implementation of the physical layer. Also, it will be motivated how embodiments may be implemented for other single-wire bi-directional sensor-ECU protocols than for the SPC or the PSI5 protocol.

FIG. 3 illustrates a data frame 300 according to the SPC protocol without encryption, serving as a starting point for the subsequent illustration of an implementation with encryption. The data frame 300 comprises information transmitted from the ECU as well as from the sensor device.

As illustrated in FIG. 3, logic information is transferred by Voltage modulation according to the illustrated SPC protocol. Other implementations may alternatively or additionally use current modulation. According to SPC, the time between two consecutive falling edges defines the value of a four bit nibble, thus representing numbers between 0 and 15. The data nibbles transport the payload or sensor data from the sensor device to the ECU. The total transmission time of a data frame, therefore, depends on the transmitted data values, i.e. on the content. A single falling edge is defined as a signal shape given by a low pulse lasting 3 unit times (UT), followed by a high pulse lasting a predetermined time defined in the protocol. The high pulse is submitted by applying a voltage above a predetermined threshold on the wired connection, while the low pulse is given by a voltage below the same threshold or below a further threshold. All values or times defined in the protocol are multiples of the unit time UT.

A bi-directional transmission of a data frame 300 comprises the following parts. The frame starts with a trigger pulse 302 of the ECU, which initiates the data transmission of the slave. The trigger pulse 302 is followed by a synchronization period 304 of 56 UT, used by the sensor device to synchronize with the clock of the ECU. The data 306 of the sensor starts with a status nibble 308 lasting between 12-27 UT. The status nibble 308 is followed by 3 to 6 data nibbles 310, each of the data nibbles lasting between 12-27 UT, the data nibbles 310 containing the sensor data, e.g. a Hall value and temperature information. The data nibbles 310 are followed by a CRC nibble 312 lasting between 12-27 UT. The data frame is terminated by an end pulse 314. The trigger pulse 3022, in particular the low time of the trigger pulse, may be used to transmit data from the ECU to the sensor device. According to some embodiments, a first key is transmitted from the ECU to the sensor device using the trigger pulse. A trigger pulse is not limited to a single waveform transiting from a high to a low state and subsequently back to the low state (a single falling edge). Further embodiments may also use more than one falling edges as a trigger pulse, depending on the particular implementation. Generally speaking, a trigger pulse is a signal waveform transmitted in order to start a data frame and depends on the chosen protocol and its particular implementation.

Based on the data frame of the SPC protocol as illustrated in FIG. 3, FIG. 4 illustrates possible different embodiments to show as to how a key exchange can be implemented in practice. In particular, FIGS. 4a to 4e show some possibilities, how the keys of the ECU and the sensor device could be encoded in one SPC protocol data frame 400 (also denoted as telegram). For a better readability, only the Trigger pulse 402 of the ECU, the Security key of the ECU 404 (the first key) and the Security key of the sensor device 406 (the second key) are elaborated on in detail, especially with respect to their relative position within the data frame. The various possible implementations of FIG. 4 are shortly characterized from top to bottom and compliant with the SPC standard.

According to a first implementation option, the Security key of the ECU 404 may be transmitted after the Trigger pulse 402, while the Security key of the sensor device 406 is transmitted between the synchronization period and the status and data nibbles.

According to a second implementation option, the Security key of the ECU 404 may be transmitted before the Trigger pulse 402, while the Security key of the sensor device 406 is transmitted between the synchronization period and the status and data nibbles.

According to a third implementation option, the Security key of the ECU 404 may be transmitted after the Trigger pulse 402, while the Security key of the sensor device 406 is transmitted between the status and data nibbles and the CRC nibble.

According to a fourth implementation option, the Security key of the ECU 404 may be transmitted after the Trigger pulse 402, while the Security key of the sensor device 406 is transmitted between the CRC nibble and the end pulse.

According to further implementations, the ECU as well as the sensor device may use 2 or even more keys. This may, for example, be achieved according to the fifth implementation option, where a first Security key 404a of the ECU 404 may be transmitted before the Trigger pulse 402, while a second Security key 404b of the ECU 404 is transmitted after the Trigger pulse 402. Similarly, a first Security key of the sensor device 406a may be transmitted between the synchronization period and the status and data nibbles, while a second security key of the sensor device 406b is transmitted between the status and data nibbles and the CRC nibble.

Similar to the last implementation, multiple transmission intervals may also be used to transmit multiple portions of long keys.

The key exchange according to the previously described embodiments may be characterized in that the first key as well as the second key are transmitted using signal pulses of variable length. In some implementations, the pulse width modulated signals correspond to digital quantities.

FIG. 5 illustrates an embodiment based on the existing PSI5 standard, in particular on its tooth gap implementation. PSI5 uses a single wire for voltage supply to the sensor device and for data transmission. The ECU provides a pre-regulated voltage to the sensor and communicates with the sensor by modulating this voltage. The occurrence of a modulation (sync signal) represents a logic 1, while a missing modulation represents a logic 0. Data transmission from the sensor device to the ECU is done by current modulation using Manchester coding and triggered by a trigger pulse of the ECU. The timing of the data transmission from the sensor device to the ECU is given by the time grid defined by the voltage modulations of the ECU.

As illustrated in FIG. 5, a logical 1 for the communication from the ECU to the sensor device is represented by the presence of a regular ("short") sync signal 502 (modulated voltage to a higher level), a logical "0" by the absence of the sync signal at the expected time window of the sync signal period. The voltage for a logical "0" remains below a predetermined threshold.

The data frames for the ECU to sensor device communication are composed by a specific start condition or a trigger pulse 504, enabling secure detection of the frame start after loss of synchronization. The trigger pulse 504 is followed by start bits 506, eventually comprising an address of the sensor device. The data field 508 containing payload data follows the start bits 506. A checksum value 510 follows the data field 508 to ensure data integrity. While the transmission of a correct data frame from the ECU to the Sensor device does not have to be acknowledged, FIG. 5 further illustrates an optional sensor device response 512, which may, for example, be implemented by transmitting a return code and return data out of a reserved data range.

According to some embodiments, the ECU may transmit his key between the sensor devices data frames, i.e. within the data field, where the sync signals 502 might otherwise only serve for synchronization. This may enable a backwards compatible implementation of encryption into existing PSI5 protocol implementations. At least after several data frames would the sensor device be in receipt of the whole key from the ECU.

The key exchange may be characterized in that first key is transmitted using voltage modulation from the Electronic Control Unit to the sensor device. Differently, the second key is transmitted using current modulation from the sensor device to the Electronic Control Unit.

According to further embodiments, it may additionally or alternatively be possible to make the ECU completely send his key message first, before the sensor is answering for the first time after a startup of the system. Independent of the chosen implementation for key transmittal from the ECU to the sensor device, the sensor device may transmit his own security key to the ECU in one of the first messages after the startup. After this handshake between the sensor device and the ECU, the secured transfer of sensor data (measurement data) from the sensor to ECU can be established.

The embodiments of FIGS. 4 and 5 illustrate, how encryption may be implemented without or with minimum change of the physical layer (bit transfer/encoding) into existing protocols, making it possible to implement encryption with little additional effort and, depending on the implementation, in a backwards compatible manner.

Figure 6:
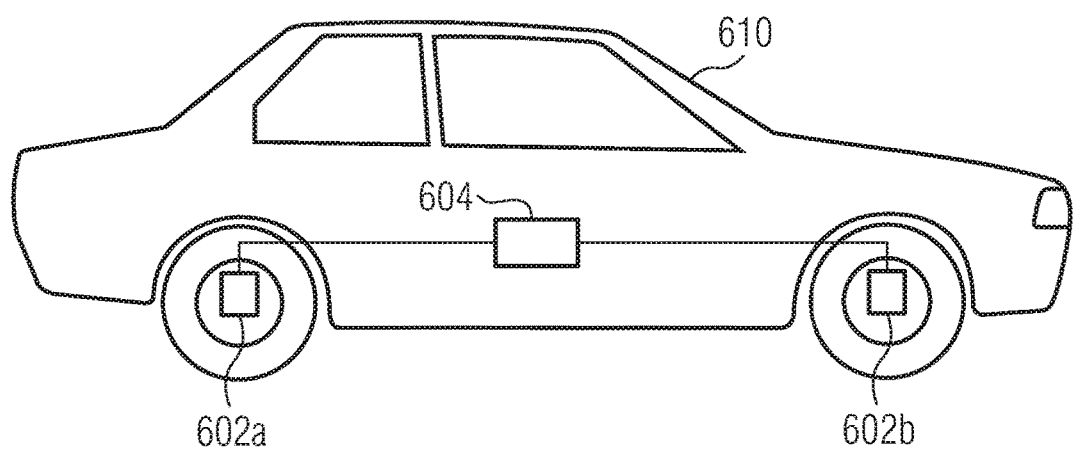
FIG. 6 schematically illustrates the application of sensor devices and an associated Electronic Control Unit within a vehicle.

FIG. 6 schematically illustrates the use of an embodiment of sensor devices 602a and 602b and an associated Electronic Control Unit 604 within a vehicle 610. In particular, sensor devices 602a and 602b serve as anti-lock braking sensors within an ABS and/or ESP (Electronic Stability Control, ESC) system, which is secured against malicious hacker attacks.

In summary of the above, embodiments as discussed herein enable a secure data transmission between a sensor device (also denoted simply as a sensor) and it's connected ECU for safety relevant applications. This may prevent undesired external influence by a third person (a "Hacker" or system intruder). The securing of the data transfer between a sensor and an ECU may be established for a single wire and bidirectional interface, by means of additional key transfers between a receiver and transceiver of this described system. These key data exchange between these two system components may be done several ways, some of which being shown in the previous paragraphs. Encryption algorithm of arbitrary complexity may be used, for example a reduced complexity may be chosen due to hardware constraints.

The aspects and features mentioned and described together with one or more of the previously detailed examples and figures may as well be combined with one or more of the other examples in order to replace a like feature of the other example or in order to additionally introduce the feature to the other example.

The description and drawings merely illustrate the principles of the disclosure. It will thus be appreciated that those skilled in the art will be able to devise various arrangements that, although not explicitly described or shown herein, embody the principles of the disclosure and are included within its spirit and scope. Furthermore, all examples recited herein are principally intended expressly to be only for pedagogical purposes to aid the reader in understanding the principles of the disclosure and the concepts contributed by the inventor(s) to furthering the art, and are to be construed as being without limitation to such specifically recited examples and conditions. Moreover, all statements herein reciting principles, aspects, and examples of the disclosure, as well as specific examples thereof, are intended to encompass equivalents thereof.

Functions of various elements shown in the figures, including any functional blocks may be implemented in the form of dedicated hardware, such as "a signal provider", "a signal processing unit", "a processor", "a controller", etc. as well as hardware capable of executing software in association with appropriate software. When provided by a processor, the functions may be provided by a single dedicated processor, by a single shared processor, or by a plurality of individual processors, some of which or all of which may be shared. However, the term "processor" or "controller" is by far not limited to hardware exclusively capable of executing software, but may include digital signal processor (DSP) hardware, network processor, application specific integrated circuit (ASIC), field programmable gate array (FPGA), read only memory (ROM) for storing software, random access memory (RAM), and non-volatile storage. Other hardware, conventional and/or custom, may also be included.

A block diagram may, for instance, illustrate a high-level circuit diagram implementing the principles of the disclosure. Similarly, a flow chart, a flow diagram, a state transition diagram, a pseudo code, and the like may represent various processes, operations or steps, which may, for instance, be substantially represented in computer readable medium and so executed by a computer or processor, whether or not such computer or processor is explicitly shown. Methods disclosed in the specification or in the claims may be implemented by a device having means for performing each of the respective acts of these methods.

It is to be understood that the disclosure of multiple acts, processes, operations, steps or functions disclosed in the specification or claims may not be construed as to be within the specific order, unless explicitly or implicitly stated otherwise, for instance for technical reasons. Therefore, the disclosure of multiple acts or functions will not limit these to a particular order unless such acts or functions are not interchangeable for technical reasons. Furthermore, in some examples a single act, function, process, operation or step may include or may be broken into multiple sub-acts, -functions, -processes, -operations or -steps, respectively. Such sub acts may be included and part of the disclosure of this single act unless explicitly excluded.

Finally, the following claims are hereby incorporated into the detailed description, where each claim may stand on its own as a separate example. While each claim may stand on its own as a separate example, it is to be noted that—although a dependent claim may refer in the claims to a specific combination with one or more other claims—other example examples may also include a combination of the dependent claim with the subject matter of each other dependent or independent claim. Such combinations are explicitly proposed herein unless it is stated that a specific combination is not intended. Furthermore, it is intended to include also features of a claim to any other independent claim even if this claim is not directly made dependent to the independent claim.

What is claimed is:

1. A method for communicating data from a sensor device to an Electronic Control Unit using a single-wire bi-directional communication protocol, the method comprising:
   providing a first key of the Electronic Control Unit to the sensor device;
   encrypting sensor data of the sensor device using the first key to generate encrypted data;
   transmitting the encrypted data from the sensor device to the Electronic Control Unit;
   transmitting a second key from the sensor device to the Electronic Control Unit;
   encrypting second data of the Electronic Control Unit with the second key to generate second encrypted data; and
   transmitting the second encrypted data from the Electronic Control Unit to the sensor device.

2. The method of claim 1, wherein the second key is transmitted before a trigger pulse.

3. The method of claim 1, wherein transmitting the second key from the sensor device to the Electronic Control Unit comprises:
   transmitting a first portion of the second key before a first trigger pulse of a first data frame; and
   transmitting a second portion of the second key before a second trigger pulse of a subsequent second data frame.

* * * * *